United States Patent
Chun (10) Patent No.: US 12,151,574 B2
(45) Date of Patent: Nov. 26, 2024

(54) CHARGING STATION FOR CHARGING ELECTRIC BUS AND CHARGING METHOD USING THE SAME

(71) Applicants: HYUNDAI MOTOR COMPANY, Seoul (KR); KIA CORPORATION, Seoul (KR)

(72) Inventor: Chong Chul Chun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 700 days.

(21) Appl. No.: 17/240,582

(22) Filed: Apr. 26, 2021

(65) Prior Publication Data

US 2022/0144116 A1  May 12, 2022

(30) Foreign Application Priority Data

Nov. 12, 2020  (KR) .................. 10-2020-0150792

(51) Int. Cl.
| | | |
|---|---|---|
| B60L 53/37 | (2019.01) | |
| B60L 53/50 | (2019.01) | |
| G01S 19/42 | (2010.01) | |
| H02J 7/00  | (2006.01) | |

(52) U.S. Cl.
CPC ............. B60L 53/37 (2019.02); B60L 53/50 (2019.02); G01S 19/42 (2013.01); H02J 7/0013 (2013.01); H02J 7/0045 (2013.01)

(58) Field of Classification Search
CPC ...... B60L 2200/18; B60L 53/14; B60L 53/30; B60L 53/50; B60L 5/38; B60L 50/53; B60L 53/67; B60L 53/65; B60L 53/35; B60L 5/36; B60L 53/37; B60L 2240/622; B60L 5/04; B60L 5/18; B60L 5/24; B60L 53/665; G01S 19/42; G01S 19/24; H02J 7/0045; H02J 7/0042; H02J 7/0013; B60M 1/30; Y02E 60/32; B60Y 2200/143
USPC ........................................................ 701/22
See application file for complete search history.

(56) References Cited

U.S. PATENT DOCUMENTS

2020/0238844 A1*  7/2020  Grace .................. B60L 53/30

FOREIGN PATENT DOCUMENTS

| KR | 20150130856 A | * | 11/2015 | ............. B60L 53/18 |
| KR | 101974070 B1  | * | 4/2019  | ............. B60L 53/60 |
| WO | WO-2010003021 A2 | * | 1/2010 | ............. B60L 5/005 |

* cited by examiner

*Primary Examiner* — Nga X Nguyen
(74) *Attorney, Agent, or Firm* — MCDONNELL BOEHNEN HULBERT & BERGHOFF LLP (57) ABSTRACT

A charging station for charging an electric bus is provided which includes a power rail extending along an axial direction above a plurality of electric buses parked in a parking space, a pantograph disposed in a lower portion of the power rail to be movable horizontally along the axial direction and expandable in a gravitational direction from above the electric bus to electrically contact the electric bus, and a controller configured to calculate a charging sequence of the plurality of electric buses based on position information of the plurality of electric buses, wherein the controller is configured to control horizontal movement of the pantograph and electrical contact with the electric bus according to the charging sequence so as to supply the power applied from an external power network through the power rail to the electric bus through the pantograph.

7 Claims, 10 Drawing Sheets

CHARGING STATION FOR CHARGING ELECTRIC BUS AND CHARGING METHOD USING THE SAME

CROSS-REFERENCE TO RELATED APPLICATION

This application claims priority to and the benefit of Korean Patent Application No. 10-2020-0150792 filed in the Korean Intellectual Property Office on Nov. 12, 2020, the entire contents of which are incorporated herein by reference.

BACKGROUND (a) Field

The present disclosure relates to a charging station for charging an electric bus and a charging method utilizing the same for charging a plurality of electric buses parked in a parking space.

(b) Description of the Related Art

With the recent trend of strengthening environmental regulations and reducing energy costs, interest and demand for environmentally-friendly electric vehicles are increasing explosively. Each country seeks to tackle environmental problems, such as air pollution, through regulation of vehicle exhaust gas, and as a part of this, supplying environment-friendly electric vehicles is becoming mandatory to automakers.

In line with this trend, interest and research on electric vehicles are being actively conducted as part of low-carbon green growth. In order to expand the distribution of electric vehicles, it is essential to build a charging infrastructure for charging electric vehicles' electric batteries.

Recently, the difficulty of building a charging station is considered to be a big obstacle in the expansion of electric buses. Most electric buses currently in use have a "plug-in type" charging method, and in the case of the plug-in type, a charger is located on the ground and there are thick and long cables for charging, so it is difficult to install it sufficiently in the narrow parking space.

Accordingly, it is urgently required to develop a charging station capable of efficiently charging without moving a plurality of electric buses parked for a long time in a narrow place such as a bus garage.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a charging station for charging an electric bus and a charging method utilizing the same, where a pantograph may sequentially charge a plurality of electric buses by moving to above the plurality of electric buses along a power rail, even if the plurality of electric buses are densely parked in a narrow place.

The present disclosure provides a charging station for charging an electric bus and a charging method utilizing the same, where the pantograph moves to above the electric bus and then expands downward to contact a contact bar installed on a top of the electric bus to charge the electric bus.

An exemplary charging station for charging an electric bus includes a power rail extending along an axial direction above a plurality of electric buses parked in a parking space, a pantograph disposed in a lower portion of the power rail to be movable horizontally along the axial direction and expandable in a gravitational direction from above the electric bus to electrically contact the electric bus, and a controller configured to calculate a charging sequence of the plurality of electric buses based on position information of the plurality of electric buses, where the controller may be configured to control horizontal movement of the pantograph and electrical contact with the electric bus according to the charging sequence so as to supply the power applied from an external power network through the power rail to the electric bus through the pantograph.

An exemplary charging station may further include a bus infrared sensor disposed in a predetermined position of a roof of the electric bus, and a main infrared sensor disposed in a predetermined position of the pantograph to face the bus infrared sensor, where the controller may be configured to adjust the position of the pantograph such that infrared rays emitted from the bus infrared sensor and the main infrared sensor match each other.

An exemplary charging station may further include a communication unit configured to receive position information of the plurality of electric buses by communicating with the electric bus, and a GPS sensor configured to receive position information of the pantograph from a satellite.

The controller may be configured to calculate a shortest moving path of the pantograph based on position information of the plurality of electric buses and position information of the pantograph, and to calculate a charging sequence of the plurality of electric buses according to the calculated shortest moving path.

The controller may be configured to control horizontal movement of the pantograph and electrical contact with the electric bus such that the plurality of electric buses parked along the axial direction are sequentially charged.

The power rail may be disposed to be movable horizontally along a direction perpendicular to the axial direction, and the controller may be configured to control the power rail to move horizontally according to the charging sequence when charging of the plurality of electric buses parked along the axial direction is finished.

The pantograph may be disposed in a plural number corresponding to the number of the plurality of electric buses that may be parked along the axial direction in the parking space, and the controller may be configured to control the electrical contact between the plurality of electric buses and the plurality of pantographs so as to supply the power applied from the external power network to the plurality of electric buses through the plurality of pantographs.

An exemplary charging method for charging an electric bus utilizes a charging station for charging the electric bus, where the charging station includes a power rail extending along an axial direction above a plurality of electric buses parked in a parking space and a pantograph disposed in a lower portion of the power rail to be movable horizontally along the axial direction and expandable in a gravitational direction from above the electric bus to electrically contact the electric bus. The charging method includes receiving position information of the plurality of electric buses by communicating with the plurality of electric buses, calculating a charging sequence of the plurality of electric buses based on position information of the plurality of electric buses, and supplying the power applied from an external power network through the power rail to the electric bus through the pantograph by control horizontal movement of the pantograph and electrical contact with the electric bus according to the calculated charging sequence.

The supplying of the power applied from the external power network to the electric bus through the pantograph may include determining whether the power rail is required to move horizontally in a direction perpendicular to the axial direction, controlling horizontal movement of the power rail depending on whether the power rail is required to move horizontally, determining whether the pantograph is required to move horizontally along the axial direction, controlling horizontal movement of the pantograph depending on whether the pantograph is required to move horizontally, controlling the pantograph to expand in the gravitational direction to electrically contact the electric bus, and supplying the power applied from the external power network to the electric bus through the pantograph.

An exemplary charging method may further include, before the controlling of the pantograph to expand in the gravitational direction to electrically contact the electric bus, adjusting the position of the pantograph such that infrared rays emitted from bus infrared sensor disposed in a roof of the electric bus and a main infrared sensor disposed in a predetermined position of the pantograph match each other.

The calculating of the charging sequence of the plurality of electric buses may calculate a shortest moving path of the pantograph based on position information of the plurality of electric buses and position information of the pantograph, and calculate a charging sequence of the plurality of electric buses according to the calculated shortest moving path.

An exemplary charging method may further include, after the supplying of the power applied from the external power network to the electric bus through the pantograph, determining whether one or more electric buses required to be charged exist among the plurality of electric buses, and identifying a subsequent electric bus to be charged based on the charging sequence when one or more electric buses required to be charged exist among the plurality of electric buses.

According to an embodiment, even if a plurality of electric buses are densely parked in a narrow place, a pantograph may sequentially charge the plurality of electric buses by moving to above the plurality of electric buses along a power rail.

According to an embodiment, a pantograph-down scheme is employed such that the pantograph having to above the electric bus expands downward to contact the electric bus to be charged. Therefore, an equipment cost and weight of the electric buses may be decreased.

DETAILED DESCRIPTION

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "contacting" to another component, it may be connected or coupled directly to the other component or may be connected to or contacting the other component with a further component intervening therebetween. Further, it is to be understood that when one component is referred to as being "directly connected to" or "directly contacting" another component, it may be connected to or contacting directly the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

Figure 1:
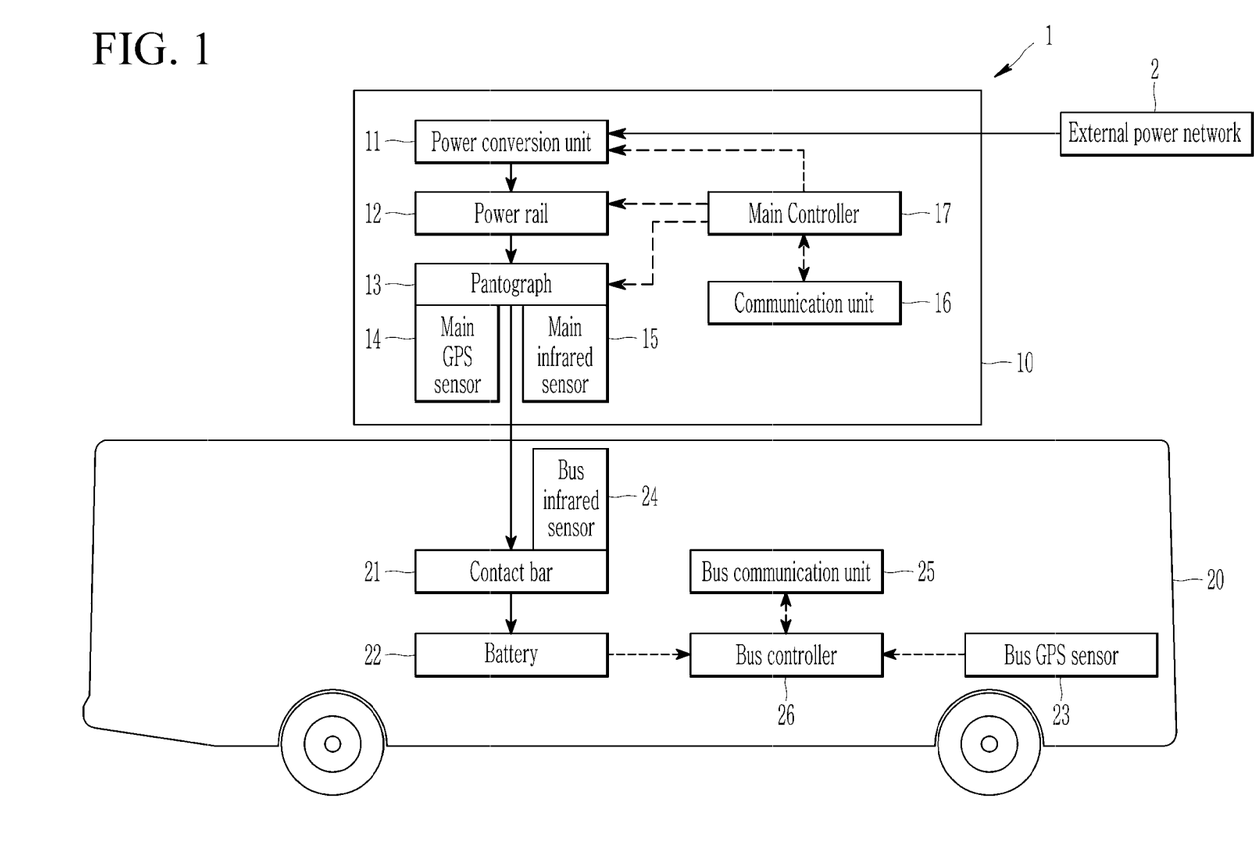
FIG. 1 is a block diagram for a charging system for charging an electric bus according to an exemplary embodiment.

FIG. 1 is a block diagram for a charging system for charging an electric bus according to an exemplary embodiment.

Referring to FIG. 1, a charging system for charging an electric bus 1 includes a charging station 10 and an electric bus 20.

The charging station 10 includes a power conversion unit 11, a power rail 12, a pantograph 13, a main GPS sensor 14, a main infrared sensor 15, a main communication unit 16, and a main controller 17. In addition, the charging station 10 may further include a related equipment for charging the electric bus 20.

The power conversion unit converter 11 receives a commercial AC power from the external power network 2, rectifies it to a DC power, and generates a charging power for charging the electric bus 20 by stepping up or down the rectified DC power.

The commercial AC power may be a single-phase AC power that can be used for home or commercial purposes. The commercial voltage is generally single-phase AC 220V in Korea, and the voltage used may vary from country to country, but is within a range of 85 to 265 V. In addition, the frequency is generally 60 Hz, or may be 50 Hz. The commercial AC power is generated by the external power network 2, and the battery 22 (described herein below) may be supplied with power of, e.g., about 3 to 6 kW.

The power rail 12 is a power supply rail that transfers electric power applied from the power conversion unit 11 to the pantograph 13. For example, when the main controller 17 detects that the pantograph 13 and the electric bus 20 are in contact and then transmits a charging control signal to the power conversion unit 11, the power may be supplied to the electric bus 20 through the pantograph 13 connected to the power rail 12. According to an exemplary embodiment, a first side of the power rail 12 is connected to the external power network 2, and a second side of the power rail 12 may extend to form an axial direction above a parking space in which a plurality of electric buses 20 are parked.

The pantograph 13 collects electric power flowing through the power rail 12 and supply the electric power to the electric bus 20. Conventionally, the pantograph was used as a current collector that supplies power to electric railway vehicles that do not depend on batteries. The pantograph 13 according to an exemplary embodiment may supply power for charging a battery 22 of the electric bus 20 parked during the night time.

The pantograph 13 may be abbreviated as panto, and the like. For example, the pantograph 13 may be structured in a single-arm type and/or a double-arm type. The double-arm type is a link structure in a rhombus shape. The double-arm type is often called a diamond type. The double-arm type is of a form such that the contacting surface and the vehicle body are connected by two links. The single-arm type has a single linkage structure, which is shaped like a leg. The single-arm type is also called a half-panto since it is in a shape that the double-arm type is cut into half, and may also be called a Z-panto or a leg-shaped pantograph since it is shaped as a Z-shape. In the single-arm type, only one link structure is installed between the contacting surface and the vehicle body.

In the case of a pantograph-up scheme, the pantograph may be provided in the electric bus 20. In this case, while the electric bus 20 is driving, the pantograph is folded and positioned on the roof of the electric bus 20. In order to start charging, the pantograph expands upward and contacts the charging station 10 to receive power. In this case, a pantograph must be provided for each of the plurality of electric buses 20. Therefore, cost increases, and a weight of the pantograph may be imposed on the electric bus 20. In addition, due to the pantograph positioned on the roof of the electric bus 20, there may be caused a problem of not being able to enter a tunnel or an underground parking lot with a low height.

In the case of a pantograph-down scheme, the pantograph 13 may be provided in the charging station 10. According to an exemplary embodiment, the pantograph 13 is positioned at a bottom of the power rail 12 in a folded state, in the idle mode in which the electric bus 20 is not charged. When entering a charging mode for charging the electric bus 20, the pantograph 13 expands downward and contacts the electric bus 20 to supply power. According to an exemplary embodiment, the charging station 10 may overcome the drawback of the pantograph-up scheme by implementing a pantograph-down scheme.

The main GPS sensor 14 may measure the current position of the pantograph 13 in real time, at every predetermined period, or at the request of the main controller 17. The main GPS sensor 14 may receive current position information of the pantograph 13 from a plurality of GPS satellites, and may transmit information (hereinafter, position information) about the measured position to the main controller 17. For example, the main controller 17 may receive the current position information of the pantograph 13 from the main GPS sensor 14 in real time in order to move the pantograph 13 to above the electric bus 20 to be charged.

The main infrared sensor 15 may accurately measure or adjust the current position of the pantograph 13 using infrared ray. For example, the main infrared sensor 15 may include a light emitting unit emitting infrared ray and a light receiving unit receiving infrared ray.

The main communication unit 16 may receive GPS position information and a preparation completion signal of the electric bus 20 by communicating with the electric bus 20, and may transmit them to the main controller 17. In addition, the main communication unit 16 may transmit a charging start control signal and a charging finish control signal transmitted from the main controller 17 to the electric bus 20. For example, the main communication unit 16 may include at least one of a short range wireless communication module, a network connection module, a mobile communication module, and a wireless Internet module to communicate with the electric bus 20.

The short range wireless communication module may be connected to the electric but 20 to enable data communication via Bluetooth, and may store information necessary for connection in a memory. The network communication module may be connected to the electric bus 20 to enable data communication via WiFi, and may store information necessary for connection in a memory. The mobile communication module may transmit or receive a wireless signal with respect to at least one of a base station, an external terminal, and a server in a mobile communication network. The wireless signal may include various types of data according to a voice call signal, a video call signal, and text/multimedia message transmission and reception. The wireless Internet module may be built in or externally mounted to the main communication unit 16 as a module for wireless Internet connection. For example, the wireless Internet module may perform WiFi-based wireless communication or WiFi Direct-based wireless communication.

The main controller 17 analyzes position information of the electric buses 20 parked in the parking space, and calculates the shortest moving path of the pantograph 13 and a charging sequence, to control the charging sequence of the electric buses 20. In this case, the parking space is not limited to the bus parking space, and may include a charging place where a battery charging station is installed for charging a mobility apparatus driven by using charged energy, such as an electric vehicle.

The electric bus 20 may include a contact bar 21, the battery 22, a bus GPS sensor 23, a bus infrared sensor 24, a bus communication unit 25, and a bus controller 26. At this time, the electric bus 20 may be an automotive vehicle driven by using charged energy, such as a pure electric bus, a pure electric vehicle, a plug-in hybrid vehicle.

The contact bar 21 is positioned on a roof of the electric bus 20, and may be supplied with electric power by contacting the pantograph 13 that expands downward in the charging mode.

The battery 22 is a power source of the electric bus 20, and is provided as a rechargeable battery, for example, a lithium-ion battery, that is capable of repeatedly charging and discharging. The battery 22 is configured by stacking cells in series therein, and has a high voltage in a range of about 240 to 413 V depending on a state of charge. Hereinafter, the term "charging the electric bus 20" is used to mean "charging a battery of the electric bus 20".

The bus GPS sensor 23 may measure the current position of the electric bus 20 in real time, every predetermined period, or at the request of the bus controller 26. The bus GPS sensor 23 may receive the current position information of the electric bus 20 from a plurality of GPS satellites, and may transmit the measured position information to the bus controller 26.

The bus infrared sensor 24 may be positioned in a roof of the electric bus 20 to face the main infrared sensor 15 positioned in the pantograph 13.

The bus communication unit 25 communicates with the charging station 10 to transmit position information of the electric bus 20 and a preparation completion signal, and to receive a charging start control signal, and a charging finish control signal to transmit them to the bus controller 26. For example, the bus communication unit 25 may include at least one of a short range wireless communication module, a network connection module, a mobile communication module, and a wireless Internet module, to communicate with the charging station 10.

The bus controller 26 may control the battery 22 to be charged with electric power applied from the charging station 10. For example, when the electric bus 20 is parked at a predetermined location in the parking space and the battery 22 enters a chargeable state, the bus controller 26 may transmit the GPS position information and the preparation completion signal of the electric bus 20 to the charging station 10 through the bus communication unit 25 such that the battery 22 may be charged by the electric power applied from the charging station 10.

Figure 2:
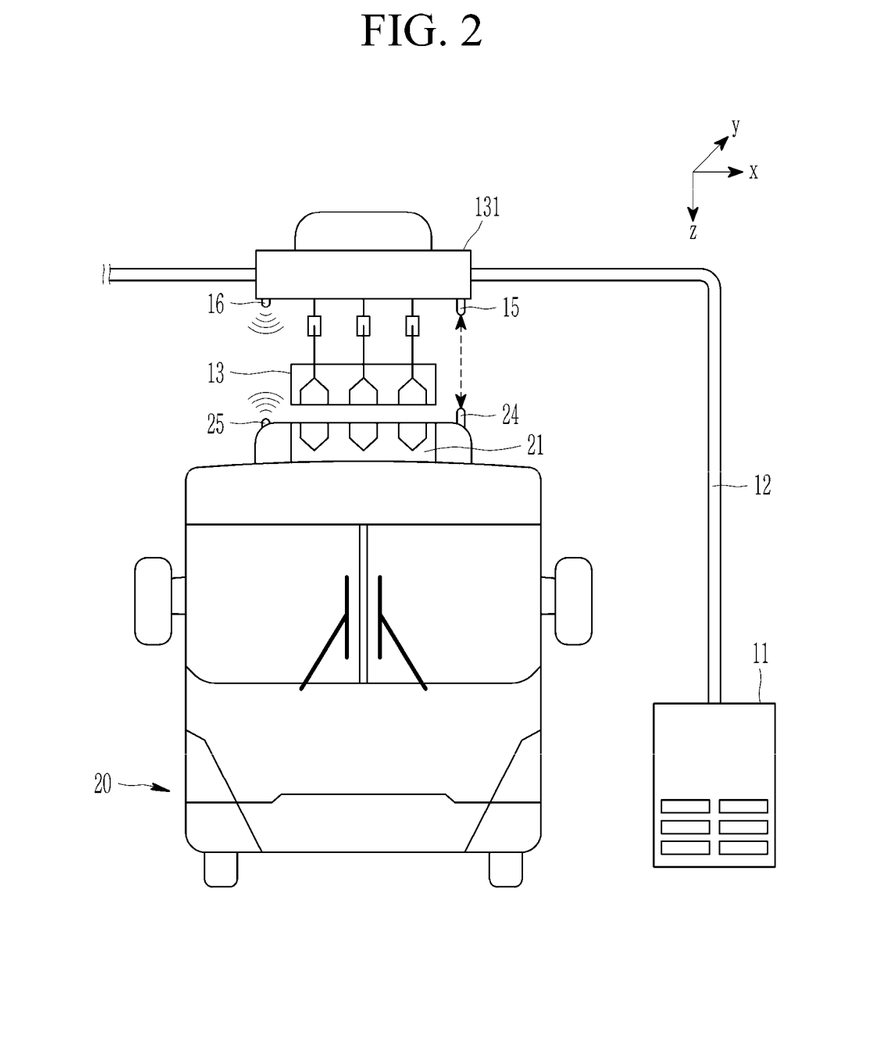
FIG. 2 is a frontal view of a state where the electric bus of FIG. 1 is connected to a charging station.

FIG. 2 is a frontal view of a state in which the electric bus of FIG. 1 is connected to a charging station.

Figure 3:
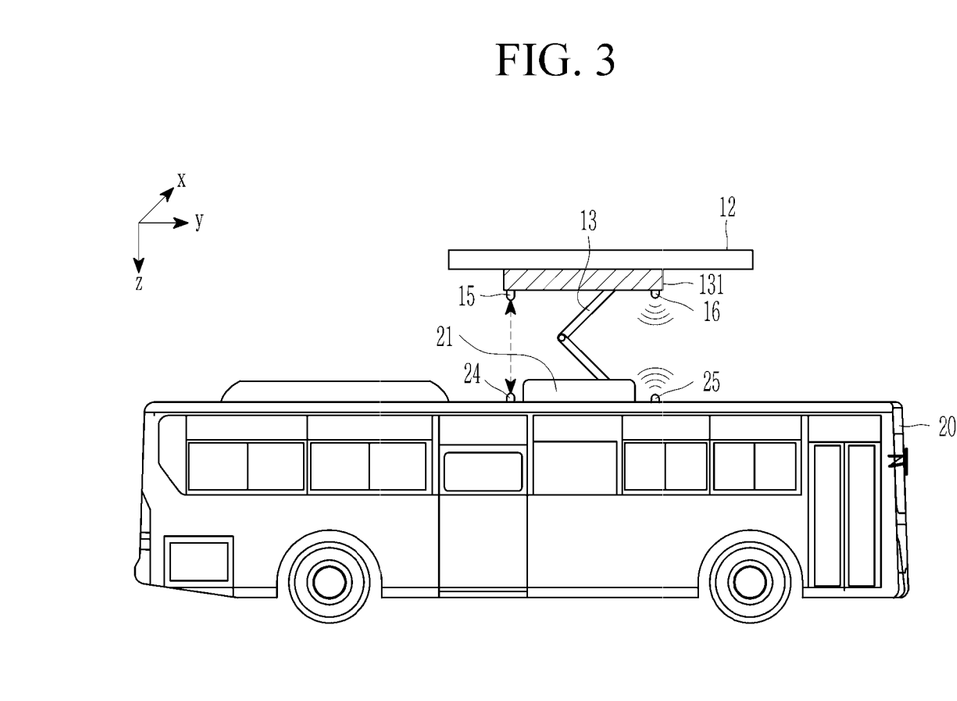
FIG. 3 is a side view of a state where the electric bus of FIG. 1 is connected to a charging station.

FIG. 3 is a side view of a state where the electric bus of FIG. 1 is connected to a charging station.

Referring to FIG. 2 and FIG. 3, the pantograph 13 may include a transferring device 131 configured to move the pantograph 13 in an axial direction (X-axis) of the power rail 12. The transferring device 131 is movably coupled to a bottom portion of the power rail 12, and fixedly coupled to an upper end portion of the pantograph 13. For example, the pantograph 13 may move horizontally along the axial direction (X-axis) of the power rail 12 through the transferring device 131.

The main infrared sensor 15 may be positioned at a predetermined position of the transferring device 131, to face at least one the bus infrared sensor 24. For example, the infrared rays emitted from of the main infrared sensor 15 and the bus infrared sensor 24 may match each other when the electrical contact between the pantograph 13 and the contact bar 21 is successful. That is, the infrared rays emitted from the main infrared sensor 15 and the bus infrared sensor 24 may guide the electrical contact of the pantograph 13 and the contact bar 21.

When the infrared rays emitted from the main infrared sensor 15 and the bus infrared sensor 24 match each other, the main controller 17 may control the pantograph 13 to enter the charging mode in which the battery 22 of the electric bus 20 is charged. The main communication unit 16 may receive the GPS position information and the preparation completion signal of the electric bus 20 by communicating with the bus communication unit 250 of the electric bus 20, and may transmit the received information and signal to the main controller 17. In addition, the main communication unit 16 may transmit the charging start control signal and the charging finish control signal transmitted from the main controller 17 to the bus communication unit 250 of the electric bus 20.

When the pantograph 13 enters the charging mode, the pantograph 13 expands downward under the control of the main controller 17, and the bottom portion of the pantograph 13 may be electrically connected to the contact bar 21 of the electric bus 20 by contacting. In FIG. 3, the pantograph 13 is illustrated as a single-arm type having a single linkage structure, but the present disclosure is not limited thereto. The pantograph 13 may be formed in various schemes, for example, as a double-arm type.

Figure 4:
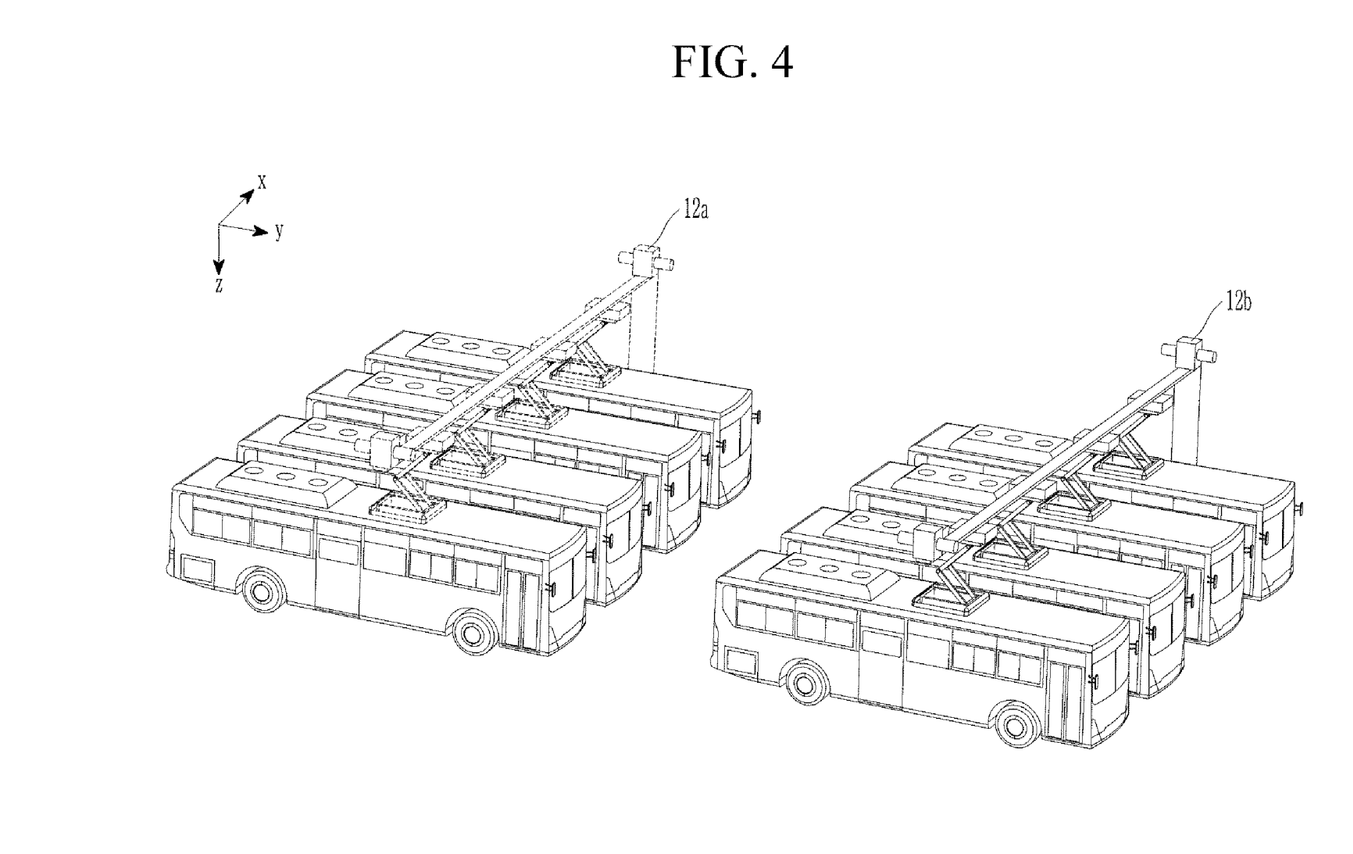
FIG. 4 is a schematic perspective view showing movement of a power rail and a pantograph according to an exemplary embodiment while a plurality of electric buses are parked in a parking space.

FIG. 4 is a schematic perspective view showing movement of a power rail and a pantograph according to an exemplary embodiment while a plurality of electric buses are parked in a parking space.

Figure 5A:
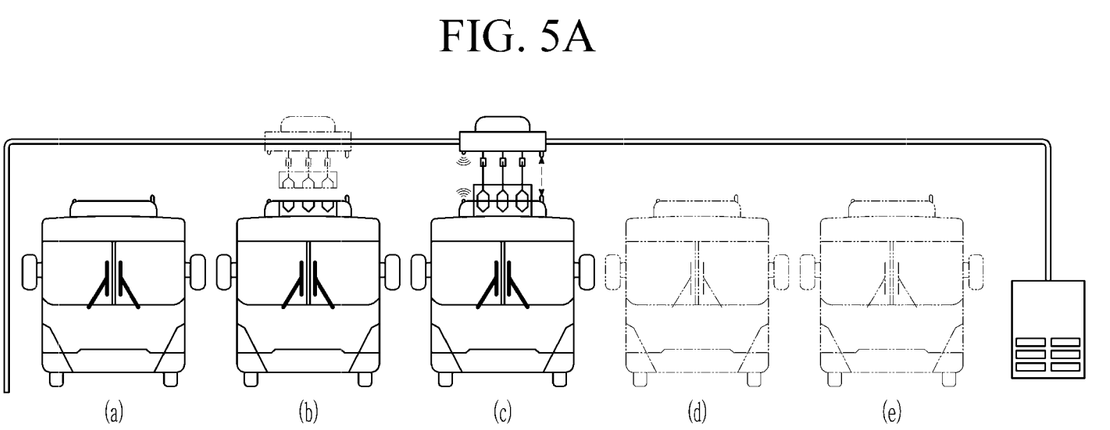
FIG. 5A and FIG. 5B illustrate examples of disposing a single pantograph and a plurality of pantographs on a power rail according to an exemplary embodiment.
Figure 5B:
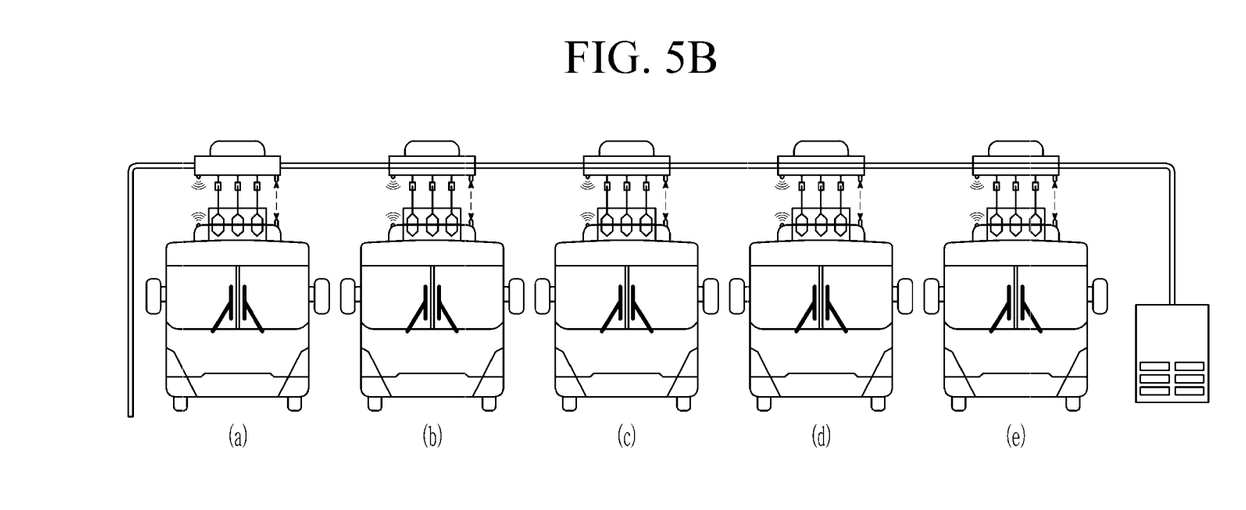

FIG. 5A and FIG. 5B illustrate examples of disposing a single pantograph and a plurality of pantographs on a power rail according to an exemplary embodiment.

Figure 6A:
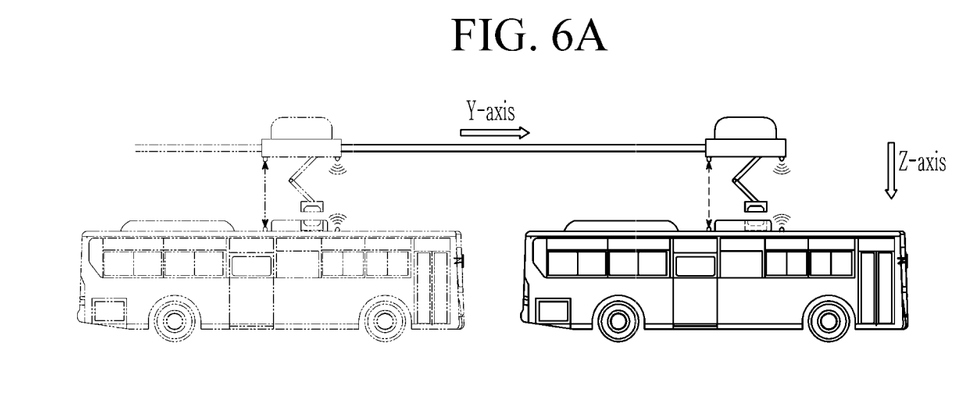
FIG. 6A and FIG. 6B illustrate a horizontal movement of a power rail and a movement of the pantograph in horizontal and gravitational directions, when a single pantograph is disposed on a power rail as shown in FIG. 5A.
Figure 6B:
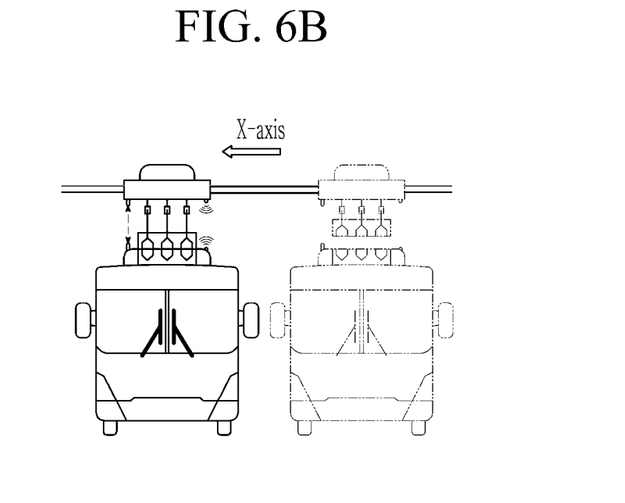

FIG. 6A and FIG. 6B illustrate a horizontal movement of a power rail and a movement of the pantograph in horizontal and gravitational directions, when a single pantograph is disposed on a power rail as shown in FIG. 5A.

Referring to FIG. 4, the plurality of electric buses 20 may be parked in-line along the axial direction (X-axis) of the power rail 12 in the parking space. When the charging of the plurality of electric buses 20 parked in a first line 12a is finished, the power rail 12 may move horizontally to a second line 12b under the control of the main controller 17. At this time, the movement from the first line 12a to the second line 12b may be along a direction (Y-axis) perpendicular to the axial direction (X-axis) of the power rail 12.

In FIG. 4, the pantographs 13 are illustrated as a quantity that corresponds to the number of the plurality of electric buses 20 that may be parked in-line along the axial direction (X-axis) of the power rail 12, for example, five pantographs 13, but the disclosure is not limited thereto. The pantographs 13 may be arranged in a quantity less than the number of the plurality of electric buses 20, such as a single pantograph 13 or two pantographs 13.

FIG. 5A illustrates an example that five electric buses 20 parked in-line along the axial direction (X-axis) of the power rail 12 may be sequentially charged by a single pantograph 13. In FIG. 5A, the charging of the electric buses 20 in (a) and (b) positions is finished, and the electric bus 20 in (c) position is currently being charged. Thereafter, the pantograph 13 may sequentially charge the electric buses 20 in (d) and (e) positions by moving along the axial direction (X-axis) of the power rail 12. That is, the electric buses 20 in (d) and (e) positions may be in a standby state before charging.

FIG. 5B illustrates an example that five electric buses 20 parked in-line along the axial direction (X-axis) of the power rail 12 are simultaneously charged by five pantographs 13. In this case, the cost to be equipped with the pantographs 13 increases, but the time required to charge the plurality of electric buses 20 may be shortened.

FIG. 6A illustrates that, the power rail 12 horizontally moves along the direction (Y-axis) perpendicular to the axial direction (X-axis), and the pantograph 13 expands downward in a gravitational direction (Z-axis) from above the electric bus 20. FIG. 6B illustrates that, the pantograph 13 horizontally moves along the axial direction (X-axis), in order to sequentially charge the plurality of electric buses 20 parked along the axial direction (X-axis) of the power rail 12.

Figure 7:
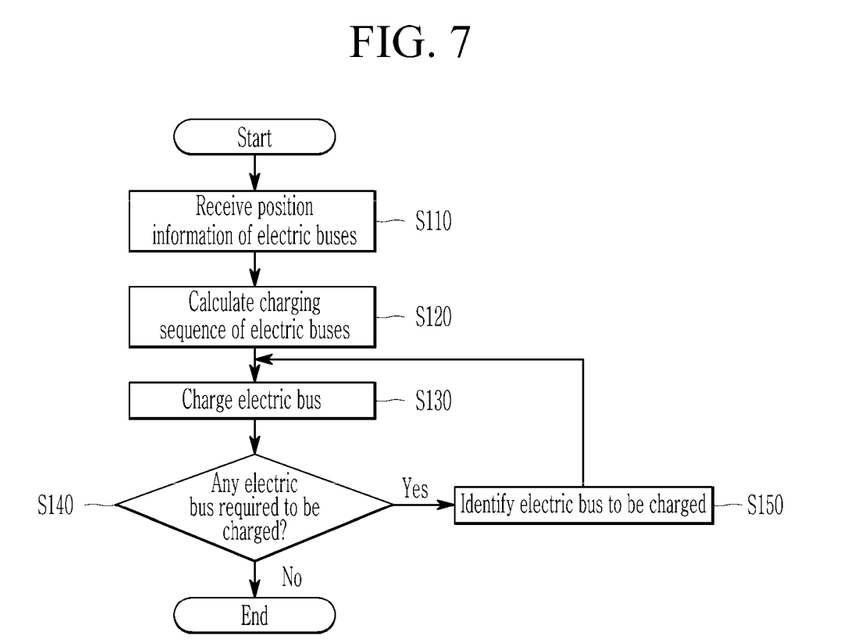
FIG. 7 is a flowchart showing a charging method for charging an electric bus according to an exemplary embodiment.
Figure 8:
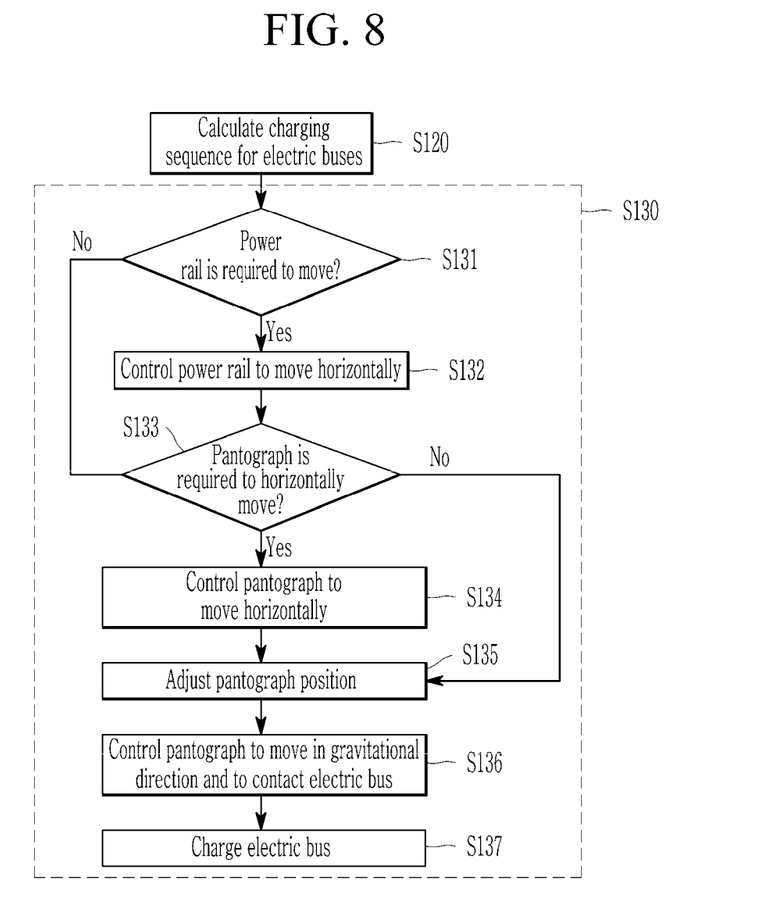
FIG. 8 is a flowchart showing details of the charging of the electric bus in FIG. 7.

FIG. 7 is a flowchart showing a charging method for charging an electric bus according to an exemplary embodiment. FIG. 8 is a flowchart showing details of the charging of the electric bus in FIG. 7.

Referring to FIG. 7, firstly at step S110, the main controller 17 receives position information of the plurality of electric buses 20 by communicating with the plurality of electric buses 20 through the main communication unit 16.

The electric bus 20 includes the bus GPS sensor 23 that receives position information from a plurality of GPS satellites in real time or every predetermined period. For example, when resting in the parking space or parking at night after the operation is terminated, the electric bus 20 may transmit current GPS position information collected through the bus GPS sensor 23 to the charging station 10.

Subsequently at step S120, the main controller 17 may calculate a charging sequence of the plurality of electric buses 20 based on position information of the plurality of electric buses 20.

The main controller 17 may calculate a shortest moving path of the pantograph 13 based on position information of the plurality of electric buses 20 and position information of the pantograph 13, and calculate a charging sequence of the plurality of electric buses 20 according to the calculated shortest moving path. For example, in order to calculate the charging sequence or to move the pantograph 13 according to the charging sequence, the main controller 17 may receive the current position information of the pantograph 13 from the main GPS sensor 14 in real time or every predetermined period.

Subsequently at step S130, the main controller 17 may charge the electric bus 20 by supplying the power applied from external power network 2 to the electric bus 20 through the pantograph 13.

The main controller 17 may control a horizontal movement of the pantograph 13 and electrical contact with the electric bus 20 according to the calculated charging sequence, to sequentially charge the plurality of electric buses 20 parked in the parking space.

Referring to FIG. 8, firstly at step S131 of the step S130, the main controller 17 may determine whether the power rail 12 is required to move horizontally, i.e., in the direction (Y-axis) perpendicular to the axial direction (X-axis).

According to an exemplary embodiment, the pantograph 13 may be disposed on the power rail 12 in a quantity less than the number of the electric buses 20 parked in-line along the axial direction (X-axis) of the power rail 12. At this time, by controlling the pantograph 13 regarding a horizontal movement along the axial direction (X-axis) of the power rail 12 and the expansion in the gravitational direction (Z-axis), the main controller 17 may sequentially charge the electric buses 20 parked in-line along the axial direction (X-axis).

Referring to FIG. 4 and FIG. 5A, when charging of all the plurality of electric buses 20 parked in the first line 12a along the axial direction (X-axis) are finished, the main controller 17 may control a horizontal movement of the power rail 12 such that the power rail 12 positioned at the first line 12a is moved to be positioned at above the plurality of electric buses 20 parked in the second line 12b. For example, when one or more electric buses 20 that are not yet charged exist among the plurality of electric buses 20 parked in the first line 12a, the main controller 17 does not horizontally move the power rail 12. Instead, the main controller 17 may sequentially charge the one or more electric buses 20 that are not yet charged, by controlling the pantograph 13 to horizontally move to above the electric bus 20 that is not yet charged, and then controlling the pantograph 13 to expand in the gravitational direction (Y-axis). In FIG. 4, the pantographs 13 are illustrated in a quantity corresponding to the number of the plurality of electric buses 20 parked in-line along the axial direction (X-axis) of the power rail 12 but the present disclosure is not limited thereto. The pantographs 13 may be disposed in a quantity less than the number of the plurality of parked electric buses 20.

According to another exemplary embodiment, the pantographs 13 may be provided in the power rail 12 in a quantity corresponding to the number of the electric buses 20 parked in-line along the axial direction (X-axis) of the power rail 12. At this time, the main controller 17 may simultaneously charge the electric buses 20 parked in-line along the axial direction (X-axis), by controlling the horizontal movement of the power rail 12 and expansion in the gravitational direction (Y-axis) of the pantographs 13.

Referring to FIG. 4 and FIG. 5B, when the simultaneously charging of the electric buses 20 parked in-line along the axial direction (X-axis) is finished, the main controller 17 may control the power rail 12 to horizontally move to be positioned above the plurality of electric buses 20 parked in a subsequent line. For example, when the simultaneous charging of the plurality of electric buses 20 parked along the first line 12a is finished, the main controller 17 may horizontally move the power rail 12 to the second line 12b.

At step S132 of the step S130, when the power rail 12 is required to be horizontally moved (S131-Yes), the main controller 17 controls the power rail 12 to horizontally move.

At step S133 of the step S130, when the power rail 12 is not required to horizontally move (S131-No), or when the required horizontal movement is finished at the step S132, the main controller 17 determines whether the pantograph 13 is required to horizontally move along the axial direction (X-axis) of the power rail 12.

At step S134 of the step S130, when the pantograph 13 is required to horizontally move (S133-Yes), the main controller 17 controls the pantograph 13 to horizontally move.

Referring to FIG. 4 and FIG. 5A, when one or more electric buses 20 that are not yet charged exist among the plurality of electric buses 20 parked in the first line 12a, the main controller 17 may control the pantograph 13 to move to be positioned above the one or more electric buses 20 that are not yet charged. That is, when all the electric buses 20 parked along the axial direction (X-axis) of the power rail 12 in the current position of the power rail 12 are not charged and one or more electric buses 20 remain in standby for charging, the main controller 17 may control the pantograph 13 to horizontally move in order to charge the electric bus 20 in standby for charging.

At step S135 of the step S130, when the pantograph 13 is not required to horizontally move (S133-No) or when the horizontal movement is finished at the step S134, the main controller 17 may adjust the position of the pantograph 13 such that the pantograph 13 may precisely contact the contact bar 21 of the electric bus 20 when expanded.

The main controller 17 may adjust the position of the pantograph 13 such that infrared rays emitted from the bus infrared sensor 24 disposed in a roof of the electric bus 20 and the main infrared sensor 15 disposed in the predetermined position of the pantograph 13 match each other.

Referring to FIG. 2 and FIG. 3, the main infrared sensor 15 may be positioned at a predetermined position in the transferring device 131, so as to face at least one bus infrared sensor 24. When the infrared rays from the main infrared sensor 15 and the bus infrared sensor 24 facing each other do not match each other, the main controller 17 may horizontally adjust the position of the pantograph 13 until the infrared rays match each other.

At step S136 of the step S130, the main controller 17 may control the pantograph 13 to expand in the gravitational direction to electrically contact the electric bus 20. That is, when the position of the pantograph 13 is adjusted such that the infrared rays match each other, the main controller 17 may control the pantograph 13 to expand at the adjusted position in the gravitational direction.

At step S137 of the step S130, the main controller 17 charges the electric bus 20 through the pantograph 13 by the power applied from external power network 2.

During the charging mode, the main controller 17 may transmit the charging start control signal and the charging finish control signal to the bus communication unit 250 of the electric bus 20 through the main communication unit 16.

Subsequently, at step S140, the main controller 17 may determine whether one or more electric buses 20 required to be charged exist among the plurality of electric buses 20.

Subsequently, when one or more electric buses 20 required to be charged exist (S140-Yes), the main controller 17 identifies, at step S150, a subsequent electric bus 20 to be charged based on the charging sequence and then repeats the S130 for the subsequent electric bus 20 to be charged.

For example, in the case that twenty electric buses 20 in total are parked in the parking space and wait for charging, when charging of the electric bus 20 that is twelfth in the charging sequence is finished, the main controller 17 may check the position of the electric bus 20 that is thirteenth in the charging sequence. The main controller 17 may set a moving path from the current position of the pantograph 13 to the position of the electric bus 20 that is thirteenth in the charging sequence, and may control the power rail 12 and/or the pantograph 13 depending on whether the power rail 12 is required to horizontally move, and whether the pantograph 13 is required to horizontally move, and the like.

Subsequently, when there is no electric bus 20 that needs to be charged (S140-No), the main controller 17 finishes the charging.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A charging station for charging an electric bus, comprising:

a power rail extending along an axial direction above a plurality of electric buses parked in a parking space;

a pantograph disposed in a lower portion of the power rail to be movable horizontally along the axial direction and expandable in a gravitational direction from above the electric bus to electrically contact the electric bus;

a controller configured to calculate a charging sequence of the plurality of electric buses based on position information of the plurality of electric buses;

a bus infrared sensor disposed in a predetermined position of a roof of the electric bus; and a main infrared sensor disposed in a predetermined position of the pantograph to face the bus infrared sensor;

wherein the controller is configured to control horizontal movement of the pantograph and electrical contact with the electric bus according to the charging sequence so as to supply the power applied from an external power network through the power rail to the electric bus through the pantograph, wherein the controller is configured to calculate a shortest moving path of the pantograph based on position information of the plurality of electric buses and the position information of the pantograph, and to calculate a charging sequence of the plurality of electric buses according to the calculated shortest moving path, and wherein the controller is configured to adjust the position of the pantograph such that infrared rays emitted from the bus infrared sensor and the main infrared sensor match each other.

2. The charging station of claim 1, further comprising:

a communication unit configured to receive position information of the plurality of electric buses by communicating with the electric bus; and a GPS sensor configured to receive position information of the pantograph from a satellite.

3. The charging station of claim 2, wherein the controller is configured to control the horizontal movement of the pantograph and the electrical contact with the electric bus such that the plurality of electric buses parked along the axial direction are sequentially charged.

4. The charging station of claim 3, wherein:

the power rail is disposed to be movable horizontally along a direction perpendicular to the axial direction; and the controller is configured to control the power rail to move horizontally according to the charging sequence when the charging of the plurality of electric buses parked along the axial direction is finished.

5. The charging station of claim 1, wherein:

the pantograph is disposed in a plural number corresponding to the number of the plurality of electric buses that may be parked along the axial direction in the parking space; and the controller is configured to control the electrical contact between the plurality of electric buses and the plurality of pantographs so as to supply the power applied from the external power network to the plurality of electric buses through the plurality of pantographs.

6. A charging method for charging an electric bus, the charging method utilizing a charging station for charging the electric bus, the charging station including a power rail extending along an axial direction above a plurality of electric buses parked in a parking space and a pantograph disposed in a lower portion of the power rail to be movable horizontally along the axial direction and expandable in a gravitational direction from above the electric bus to electrically contact the electric bus, the charging method comprising:

receiving position information of the plurality of electric buses by communicating with the plurality of electric buses;

calculating a charging sequence of the plurality of electric buses based on position information of the plurality of electric buses; and     supplying the power applied from an external power network through the power rail to the electric bus through the pantograph by control horizontal movement of the pantograph and electrical contact with the electric bus according to the calculated charging sequence,     wherein the calculating of the charging sequence of the plurality of electric buses calculates a shortest moving path of the pantograph based on position information of the plurality of electric buses and position information of the pantograph, and calculates a charging sequence of the plurality of electric buses according to the calculated shortest moving path, and     wherein the supplying of the power applied from the external power network to the electric bus through the pantograph comprises:

determining whether the power rail is required to move horizontally in a direction perpendicular to the axial direction;

controlling horizontal movement of the power rail depending on whether the power rail is required to move horizontally;

determining whether the pantograph is required to move horizontally along the axial direction;

controlling horizontal movement of the pantograph depending on whether the pantograph is required to move horizontally;

controlling the pantograph to expand in the gravitational direction to electrically contact the electric bus;

supplying the power applied from the external power network to the electric bus through the pantograph; and     before the controlling of the pantograph to expand in the gravitational direction to electrically contact the electric bus, adjusting the position of the pantograph such that infrared rays emitted from a bus infrared sensor disposed in a roof of the electric bus and a main infrared sensor disposed in a predetermined position of the pantograph match each other.

7. The charging method of claim 6, further comprising after the supplying of the power applied from the external power network to the electric bus through the pantograph:

determining whether one or more electric buses required to be charged exist among the plurality of electric buses; and     identifying a subsequent electric bus to be charged based on the charging sequence when one or more electric buses required to be charged exist among the plurality of electric buses.

\* \* \* \* \*